(12) United States Patent
Patwardhan et al.

(10) Patent No.: US 7,949,741 B2
(45) Date of Patent: May 24, 2011

(54) PRINTER USER INTERFACE REDIRECTION OVER A TERMINAL SERVICES SESSION

(75) Inventors: Makarand V. Patwardhan, Redmond, WA (US); Vladimir K. Stoyanov, Redmond, WA (US); Gaurav Daga, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 669 days.

(21) Appl. No.: 11/708,451

(22) Filed: Feb. 20, 2007

(65) Prior Publication Data

US 2008/0201485 A1    Aug. 21, 2008

(51) Int. Cl.
*G06F 15/173* (2006.01)

(52) U.S. Cl. ........ 709/223; 709/203; 709/217; 709/224; 358/1.13

(58) Field of Classification Search ............. 709/203, 709/217, 223, 224; 358/1.13, 1.15
See application file for complete search history.

(56) References Cited

U.S. PATENT DOCUMENTS

| | | | | |
|---|---|---|---|---|
| 5,805,777 | A * | 9/1998 | Kuchta | 358/1.13 |
| 6,003,069 | A | 12/1999 | Cavill | |
| 6,308,205 | B1 * | 10/2001 | Carcerano et al. | 709/221 |
| 6,538,763 | B1 * | 3/2003 | Klosterman et al. | 358/1.15 |
| 6,631,010 | B1 * | 10/2003 | Foster et al. | 358/1.15 |
| 6,671,743 | B1 * | 12/2003 | Verity | 719/321 |
| 6,763,501 | B1 | 7/2004 | Zhu et al. | |
| 6,836,786 | B1 * | 12/2004 | Zoller et al. | 709/203 |
| 6,999,912 | B2 * | 2/2006 | Loisey et al. | 703/21 |
| 7,102,783 | B2 | 9/2006 | Morooka et al. | |
| 7,529,823 | B2 * | 5/2009 | Trufinescu et al. | 709/223 |
| 7,590,750 | B2 * | 9/2009 | Adbo et al. | 709/231 |
| 7,617,275 | B2 * | 11/2009 | Zoller et al. | 709/203 |
| 7,633,483 | B2 * | 12/2009 | Ben-Schachar et al. | 345/100 |
| 2003/0112456 | A1 | 6/2003 | Tomita et al. | |
| 2003/0184782 | A1 | 10/2003 | Perkins et al. | |
| 2003/0200361 | A1 | 10/2003 | Dogra et al. | |
| 2004/0136023 | A1 | 7/2004 | Sato | |
| 2004/0249936 | A1 | 12/2004 | Ishida | |
| 2005/0046891 | A1 * | 3/2005 | Pavlov et al. | 358/1.15 |
| 2005/0060367 | A1 * | 3/2005 | Brockway et al. | 709/203 |
| 2005/0068569 | A1 * | 3/2005 | Hull et al. | 358/1.15 |
| 2005/0162688 | A1 | 7/2005 | Nakaoka et al. | |
| 2005/0210129 | A1 * | 9/2005 | Feng et al. | 709/224 |
| 2005/0225795 | A1 | 10/2005 | Nuggehalli et al. | |
| 2006/0176499 | A1 * | 8/2006 | Shintoku | 358/1.13 |

(Continued)

OTHER PUBLICATIONS

"Redirect Printing Black Ice Printer Drivers", http://www.blackice.com/Printer%20Drivers/Redirect%20Printing.htm.

(Continued)

*Primary Examiner* — Lashonda T Jacobs

(57) ABSTRACT

User interface ("UI") redirection for a local device, such as a printer that is operatively coupled to a client, is provided by an arrangement in which a dummy driver is installed on the terminal server. When an application on the terminal server makes a call to show a UI, the dummy driver redirects the call to a process operating on the client that exposes the specific UI associated with the local device. User input to the UI indicative of preferences and/or other user-selected parameters is recorded and passed to the terminal server through the dummy driver and reported to the calling application. In an illustrative example, the terminal server and client communicate over a virtual channel using a remote desktop protocol in order to redirect print jobs to a local printer that is coupled to the client either directly or over a network such as a local area network.

20 Claims, 5 Drawing Sheets

U.S. PATENT DOCUMENTS

2006/0221361 A1 10/2006 Takagi
2006/0248180 A1* 11/2006 Bernardi et al. .............. 709/223
2007/0171921 A1* 7/2007 Wookey et al. .............. 370/401

OTHER PUBLICATIONS

"Terminal Server Printer Redirection Wizard Tool", Date: 2006, http://www.microsoft.com/downloads/details. aspx?FamilyId=9AD27BE9-40DB-484F-862E-38A094EEEAF7&displaylang=en.

Bragt, Wilco Van, "Can Third Party Software Solve your Terminal Server Printing Problems?", Date: 2006, http://www.msterminalservices.org/articles/Can-Third-Party-Software-Solve-Terminal-Server-Printing-Problems.html.

* cited by examiner

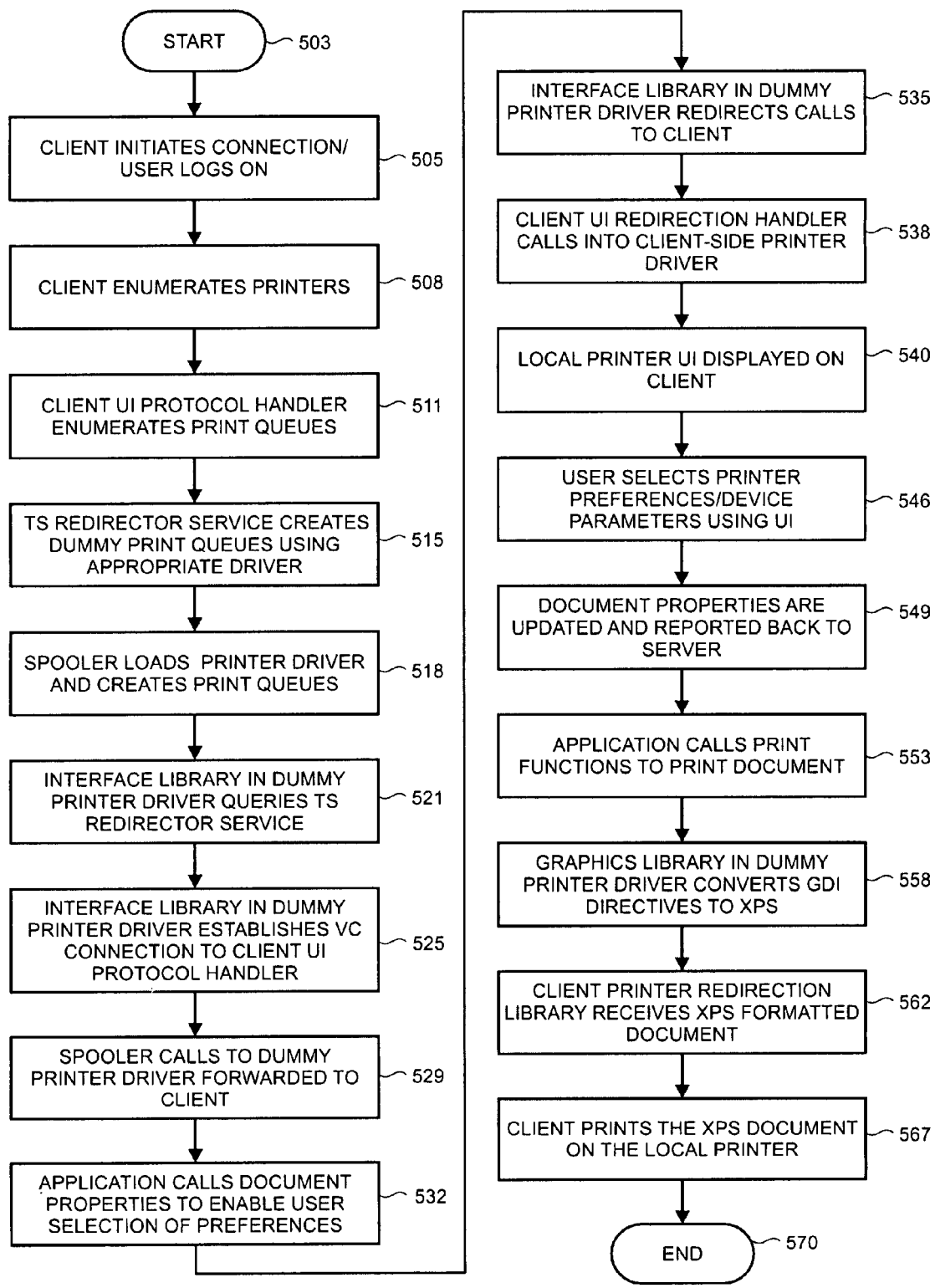

PRINTER USER INTERFACE REDIRECTION OVER A TERMINAL SERVICES SESSION

BACKGROUND

Printer redirection is a technique that works to route printing jobs from a terminal server to printers attached to local computers (typically called "client computers"). Printer redirection may typically be performed when the local printer uses a matching printer driver that is installed on the terminal server. When a user logs on to a session on the terminal server, one or more of the local printers attached to the client computers is accessed and a local queue is created on the terminal server. The user may thus print documents locally even though an application creating the document (such as a spreadsheet or word processor) is hosted remotely on the terminal server.

Current printer redirection techniques generally require that an exact matching driver for the printer be installed on both the terminal server and client side. This requirement may pose several major problems. For example, administrators must ensure that a variety of different printer drivers are installed on the terminal server which can be time consuming and complex. In some cases where the terminal server and client computer use different versions of an operating system, a matching printer driver for the client operating system may not be installable on the terminal server. Or, the printer manufacturer may not have developed a printer driver for both operating system versions.

While a generic printer driver may be installed on the terminal server side to avoid some of the problems with installing matching drivers, such generic drivers are not typically capable of exposing a complete printing and document preferences interface associated with a particular client printer to the user during printer redirection. Such printing preferences include, for example, preferences associated with page layout and orientation, paper size, single page or duplex printing, scaling, and physical print characteristics (e.g., paper tray selection, image quality, resolution, color, etc.). Thus, an inability to access a user interface for native printer preferences may present a shortcoming that can degrade the user's experience during a terminal server session.

This Background is provided to introduce a brief context for the Summary and Detailed Description that follows. This Background is not intended to be an aid in determining the scope of the claimed subject matter nor be viewed as limiting the claimed subject matter to implementations that solve any or all of the disadvantages or problems presented above.

SUMMARY

User interface ("UI") redirection for a local device such as a printer that is operatively coupled to a client is provided by an arrangement in which a dummy driver is installed on the terminal server. When an application on the terminal server makes a call to show a UI, the dummy driver redirects the call to a process operating on the client that exposes a specific UI associated with the local device. User input to the UI indicative of preferences and/or other user-selected parameters is recorded and then passed to the terminal server through the dummy driver. The preferences and parameters are reported, in turn, to the calling application.

In various illustrative examples, the terminal server and client communicate over a virtual channel using a remote desktop protocol in order to redirect print jobs to a local printer that is coupled to the client, either directly or over a network such as a local area network. A dummy printer driver on the terminal server redirects any call to the client for processing of the print job including the display of local printer-specific UI pages, and returns user input into the UI back to the calling application on the terminal server. An XPS format (XML Paper Specification, where XML is an acronym for eXtensible Markup Language) is used for the redirected print jobs between the terminal server and the client. The client prints the XPS documents on the local printer using the user-specified parameters.

Advantageously, the present arrangement enables a rich client-side printer UI to be exposed to the user. The UI enables a full suite of printing and document preferences that are specific to the local printer to be utilized in a terminal server session.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 5 is a flow chart for an illustrative method for redirecting printer preferences and printer output from the terminal server to the client computer shown in FIG. 1 over a terminal server session.

DETAILED DESCRIPTION

Terminal services provide functionality similar to a terminal-based, centralized host, or mainframe environment in which multiple terminals connect to a host computer. Each terminal provides a conduit for input and output between a user and the host computer. A user can log on at a terminal, and then run applications on the host computer, accessing files, databases, network resources, and so on. Each terminal session is independent, with the host operating system managing multiple users contending for shared resources.

The primary difference between terminal services and the traditional mainframe environment is that the terminals in a mainframe environment only provide character-based input and output. A remote desktop client or emulator provides a complete graphical user interface, including a Microsoft Windows® operating system desktop and support for a variety of input devices, such as a keyboard and mouse.

In the terminal services environment, an application runs entirely on the terminal server. The remote desktop client performs no local execution of application software. The server transmits the graphical user interface to the client. The client transmits the user's input back to the server.

Figure 1:
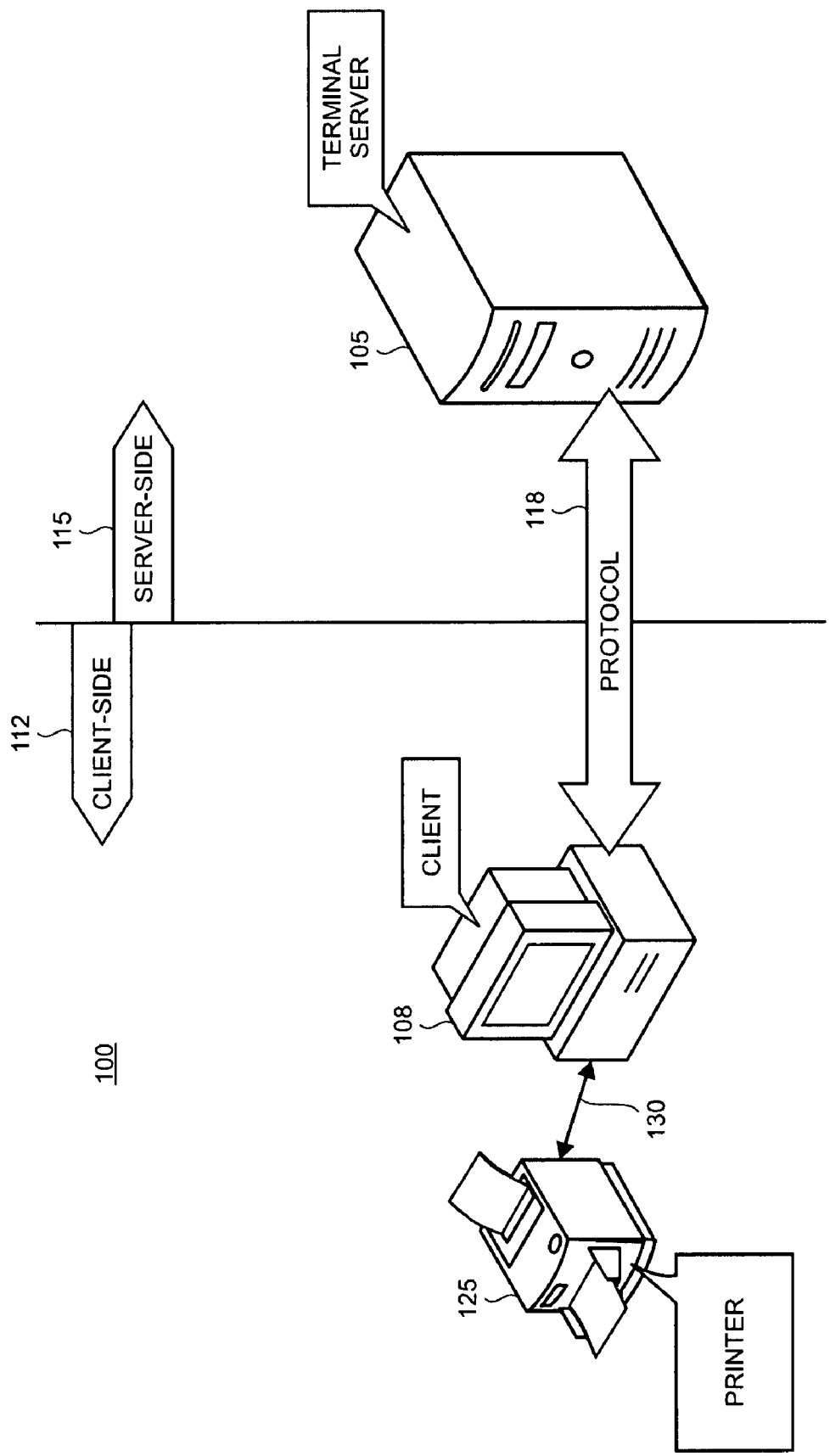
FIG. 1 is a diagram of an illustrative architecture supporting a terminal services session between a terminal server and a client computer.

Turning now to the figures where like reference numerals indicate like elements, FIG. 1 is a diagram of an illustrative architecture 100 supporting a terminal services session between a terminal server 105 and a client computer 108. Architecture 100 is divided into a client-side and a server-side, respectively, as indicated by reference numerals 112 and 115. Terminal server 105 on the server-side 115 operatively communicates with the client computer 108 on the client-side 112 using a terminal services protocol 118. In this illustrative example, the terminal services protocol 118 is arranged to use a Remote Desktop Protocol ("RDP") that typically operates over a TCP/IP (Transmission Control Protocol/Internet Protocol) connection between the client computer 108 and terminal server 105.

A local printer 125 is operatively coupled to the client computer 108 via line 130 which represents either a direct physical connection between the client computer 108 and local printer 125, or a connection through a network such as a local area network. While this illustrative example shows a printer, it is emphasized that other types of devices may be utilized with the present redirection arrangement. For example, scanners, storage devices, media rendering devices (e.g., music and video players) and other common peripheral devices are usable where user-selected preferences or parameters are desired to be specified. In addition, such devices may be arranged to be compatible with Universal Plug and Play ("UPnP") protocols.

Figure 2:
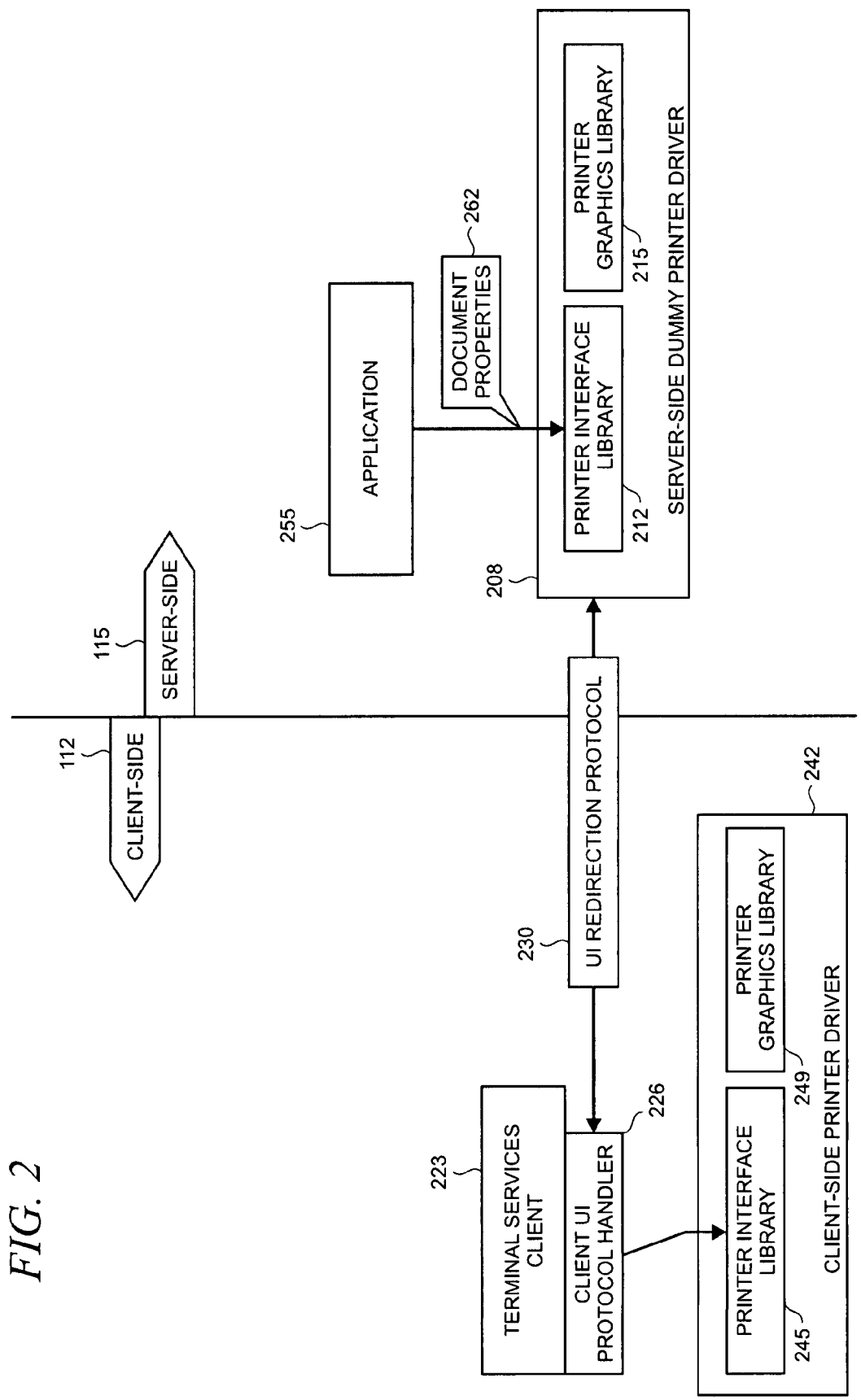
FIG. 2 is a diagram showing illustrative modules that are arranged for redirecting printer preferences and a related user interface from the terminal server to the client computer shown in FIG. 1.

FIG. 2 is a diagram showing illustrative modules that are arranged for redirecting printer preferences and a related user interface from the terminal server 105 to the client computer 108 shown in FIG. 1. On the server-side 115, a dummy printer driver 208 is installed on the terminal server 105. Dummy printer driver 208 includes two components: a printer interface library 212, and a printer graphics library 215. In this illustrative example, printer interface library 212 and printer graphics library 215 are arranged as dynamically linked libraries ("DLLs").

Dummy printer driver 208 is arranged for reporting and managing printer properties, capabilities, preferences and other parameters. Typically, the dummy printer driver 208 is loaded by a print spooler as well as by any application running on terminal server 105 that is configured for printing.

On the client-side 112, a terminal services client 223 operates on client computer 108. The terminal services client 223 operates as the interface to the terminal server 105 during a terminal services session. A client UI protocol handler 226 is coupled to the terminal services client 223 as shown in FIG. 2. In some applications of printer redirection, the client UI protocol handler 226 may be arranged as a plug-in module to the terminal services client 223.

The client UI protocol handler 226 is arranged to interface with a client-side printer driver 242 which is printer-specific and associated with printer 125 (FIG. 1). Client-side printer driver 242 includes two components: a printer interface library 245, and a printer graphics library 249. As with the server-side dummy printer driver 208, in this illustrative example, printer interface library 245 and printer graphics library 249 are arranged as DLLs.

The client UI protocol handler 226 is the counterpart to the printer interface library 212 in the server-side dummy printer driver and thus functions with the printer interface library in a coordinated manner to redirect printer properties, preferences, and data describing printer capabilities. In an optional configuration using the Microsoft "Longhorn" Windows Server™ printer driver model, the client UI protocol handler 226 also handles negotiation of print tickets. Such print tickets specify user intent and device configuration information. The client UI protocol handler 226 is further arranged to receive the printer output generated by the redirected printer commands which it feeds to a local printer queue either directly or through a converter, depending on the particular format of the printer output.

The server-side dummy printer driver 208 communicates to the client UI protocol handler 226 using a UI redirection protocol 230. UI redirection protocol 230 may be arranged using a virtual channel arrangement that is supported under the RDP protocol.

Figure 3:
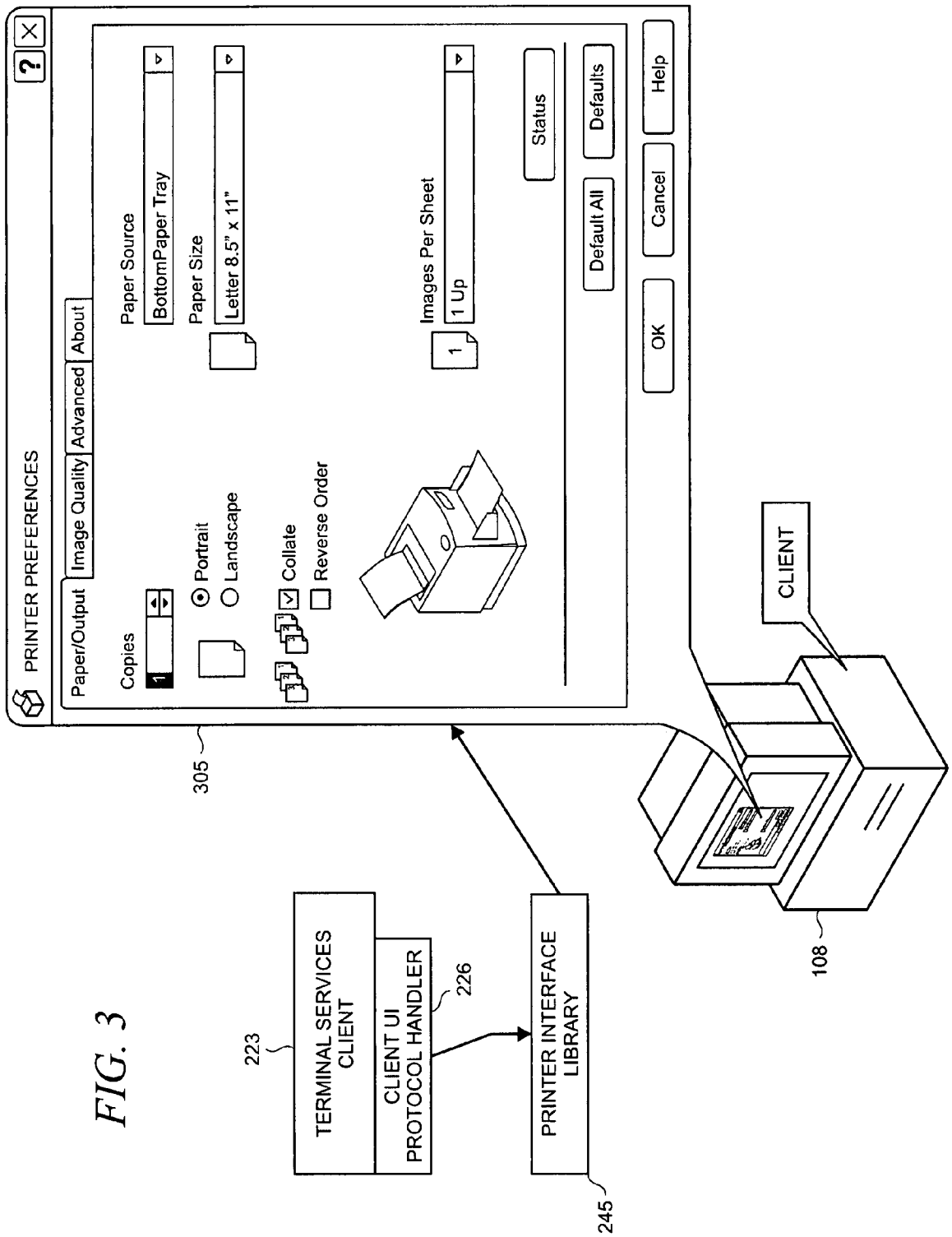
FIG. 3 shows an illustrative user interface for setting printing preferences that is exposed by a terminal services client in response to a redirected call to the client computer.

An application 255 (e.g., a word processor or spreadsheet) running on the terminal server 105 on the server-side 115 makes an API call for document properties as indicated by reference numeral 262 which the printer interface library 212 redirects to the UI protocol handler 226. In this illustrative example, document properties are handled under the Microsoft Windows® operating system data structure called DEVMODE which holds information about the initialization and environment of a printer or other device. On the client-side, responsively to the document properties call, the UI protocol handler 226 calls into the printer interface library 245 to expose a printer-specific UI to the terminal services client 223 operating on client computer 108. As noted above, the printer-specific UI is associated with the local printer 125 that is operatively coupled to the client computer 108. An illustrative printer-specific UI 305 is shown in FIG. 3.

Figure 4:
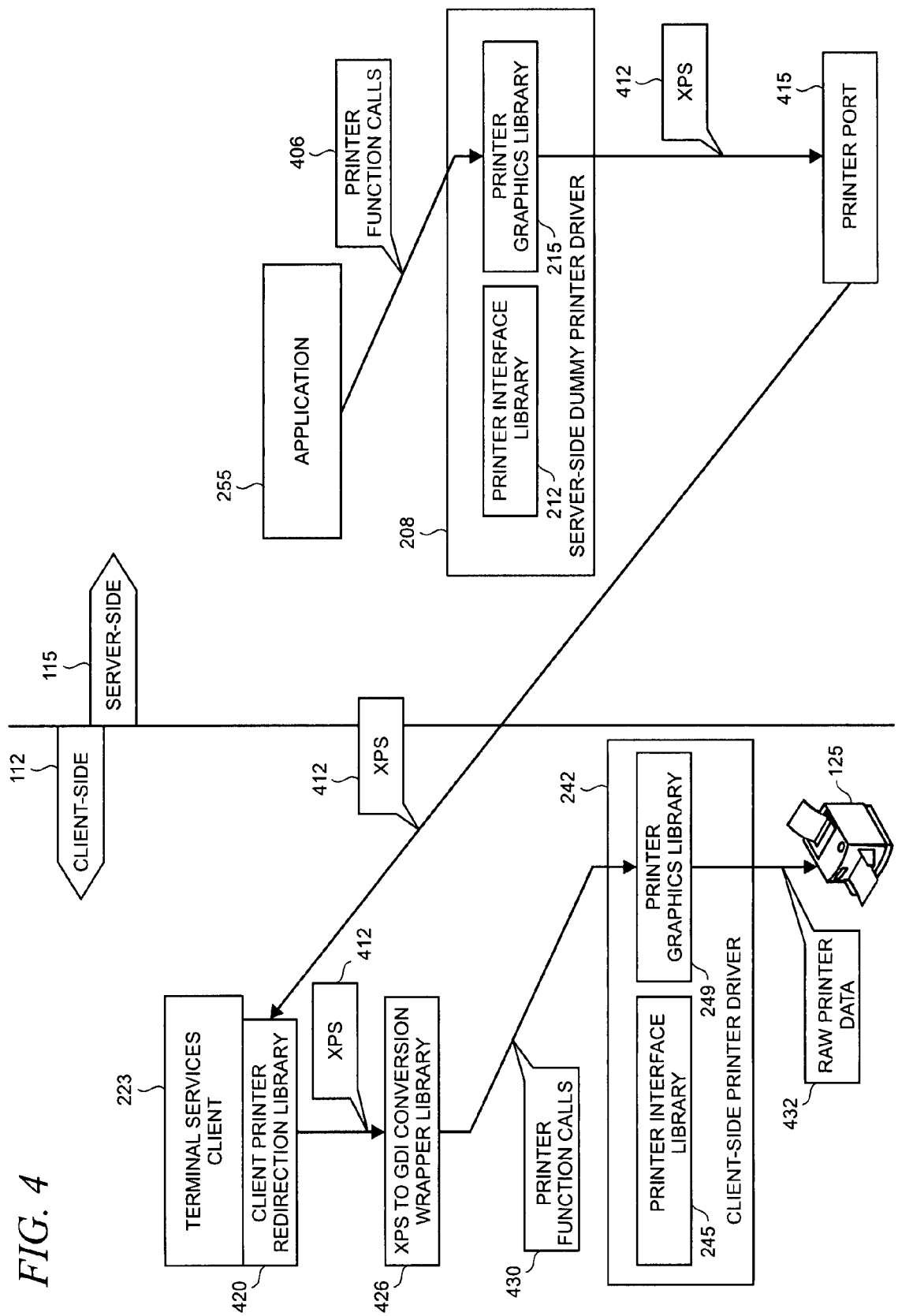
FIG. 4 is a diagram showing illustrative modules that are arranged for redirecting printer output from the terminal server to the client computer shown in FIG. 1.

FIG. 4 is a diagram showing illustrative modules that are arranged for redirecting printer output from the terminal server 105 to the client computer 108 shown in FIG. 1. On the server-side 115, the application 255 makes calls into a set of printer functions including, for example, creation of a device context ("DC") and drawing/rendering functions as required to print a document (i.e., a "print job") under the Microsoft GDI (Graphical Device Interface) API (Application Programming Interface). These GDI calls are represented by reference numeral 406 in FIG. 4.

The printer graphics library 215 is invoked to convert the GDI print job into an XPS format in this illustrative example. Alternatively, a GDI print path is used without the conversion to XPS. Other document formats such as Adobe Postscript, PDF (Portable Document Format) and PCL (Printer Control Language) are also alternatively usable depending on the requirements of a specific application. The XPS formatted print job, as indicated by reference numeral 412 is spooled using redirection port 415 disposed in terminal server 105 to a client printer redirection library 420.

Client printer redirection library 420 is coupled to the terminal services client 223, as shown. Client printer redirection library 420 is arranged to enumerate print queues on the client-side 112, and forward details to the terminal services ("TS") redirector service (not shown) on the server side 115. The client printer redirection library 420 receives the XPS formatted print job and invokes an XPS to GDI conversion wrapper library 426 which provides an interface to the client printer redirection library 420 to thereby print an XPS document to a given print queue. In some applications of printer redirection, the client printer redirection library 420 is arranged as a plug-in module to the terminal services client 223.

The wrapper library 426 functions as a wrapper around a set of managed WPF (Windows Presentation Format) library classes used to convert XPS back into GDI as may be necessary so that GDI-based printers can render the print job. The wrapper library 426 provides GDI API function calls, as indicated by reference numeral 430 to the printer graphics library 249 in the client-side printer driver 242. The printer graphics library 249 generates raw printer data 432 which is transmitted to the printer 125 in order to print the print job.

FIG. 5 is a flow chart for an illustrative method 500 for redirecting printer preferences and printer output from the terminal server 105 to the client computer 108 shown in FIG. 1 over a terminal server session. Method 500 includes two major components: 1) The application 255 calls the document properties function to obtain/set the various printer-specific features and document options from the printer interface library 212 which exposes the printer-specific UI 305 to enable user input to be recorded into the DEVMODE structure which is passed to the application 255 and, 2) the application 255 calls the create DC function and passes the received DEVMODE structure to the printer graphics library 215 which converts the GDI calls to a document format for transfer to the client computer 108 on an appropriate port.

Method 500 starts at block 503. At block 505, a user at the terminal services client 223 logs on. At block 508, the terminal services client 223 enumerates the printers, and sends data to a TS redirector service on the server side 115.

At block 511, the client printer redirection library 420 enumerates the print queues installed on the client computer 108, and gathers the following data which is sent to the terminal server 105: 1) print queue name; 2) print queue driver details; and 3) the capability for the terminal services client 223 to handle XPS formatted documents.

The TS redirector service creates dummy print queues at block 515. The TS redirector service checks the availability of a printer driver that is installed on the terminal server 105 that matches the local printer 125. If a matching printer driver is unavailable, then the server-side dummy printer driver 208 is utilized. In each case, the TS redirector service requests the spooler to create print queues using the appropriate printer driver.

At block 518, the spooler loads the printer driver and creates print queues. In the example that follows, it is assumed that the server-side dummy printer driver 208 is loaded and utilized. The printer interface library 212 then queries the TS redirector service to establish its identity, as shown at block 521. At block 525, the printer interface library 212 establishes a dynamic virtual channel connection to the client UI protocol handler 226 on the client-side 112. When the printer interface library 212 is called by the spooler to query its capabilities, the printer interface library 212 forwards all these requests to the client UI protocol handler 226 and reports results back to the spooler, as shown at block 529.

The application 255 calls document properties to enable user selection of printer preferences at block 532. This results, as indicated at block 535, in a call to the printer interface library 212 which is redirected, over the UI redirection protocol 230, to the client UI protocol handler 226 on the client-side 112. At block 538, the client UI protocol handler 226 calls into the client-side printer driver 242. At block 540, a local printer-specific UI 305 is displayed on the terminal services client 223. At block 546, the user selects printer preferences and device parameters using the UI. At block 549, the selected document properties are updated using the DEVMODE structure and reported back to the server-side 115. The printer interface library 212 reports the updated DEVMODE back to the calling application 255.

At block 553, the application 255 makes printer function calls (e.g., create DC) as required to print a document. At block 558, the printer graphics library 215 then converts the GDI directives into an XPS format, embeds the DEVMODE structure into the document, and sends the document over the redirected printer port 415. At block 562, the client printer redirection library 420 receives the XPS formatted document. It prints the XPS formatted document by invoking the XPS to GDI conversion wrapper library 426, as indicated by block 567. Method 500 ends at block 570.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for redirecting calls over a session between a terminal server and a client, the method comprising the steps of:
receiving a call from an application running on the terminal server, the call arranged for requesting user input for setting preferences;
redirecting the call to a process running on the client using one or more processors, the process being arranged for exposing a user interface on the client for enabling setting of the preferences, and the user interface being associated with a local device that is in operative communication with the client;
receiving a record of input to the user interface; and
reporting the record to the calling application.

2. The method of claim 1 in which the local device is a printer that is either directly coupled to the client or coupled to the client over a network.

3. The method of claim 2 in which the process is supported by a client-side printer driver, the client-side printer driver comprising a printer interface library and a graphics library.

4. The method of claim 1 in which the redirecting is performed using a UI redirection protocol selected from one of remote desktop protocol or terminal services protocol.

5. The method of claim 1 including a further step of converting a print job generated by the application into an XPS format.

6. The method of claim 1 including a further step of establishing a dynamic virtual channel connection to a UI redirection protocol handler disposed in the client.

7. The method of claim 1 including a further step of loading a dummy server-side driver if a device driver matching the local device cannot be located on the terminal server.

8. A method for enabling selection, during a terminal server session, of one or more parameters associated with a local device coupled to a client, the method comprising the steps of:
receiving a redirected call from a terminal server driver, the redirected call being generated responsively to a command generated by an application operating on a terminal server;
invoking a method responsively to the redirected call for exposing, on the client, a user interface for the local device;
recording input to the user interface; and
reporting the input to the terminal server driver.

9. The method of claim 8 in which the local device is one of printer, scanner, storage device, media rendering device, or UPnP device.

10. The method of claim 8 in which the terminal server driver is a dummy driver.

11. The method of claim 8 in which the method for exposing is performed by a client-side driver.

12. The method of claim 11 in which the client-side driver is specific to the local device.

13. The method of claim 8 including a further step of invoking a method for handling a print job generated by the application.

14. The method of claim 13 in which the print job is in an XPS format that includes document rendering data and printing preferences.

15. A non-transitory computer-readable medium containing instructions which, when executed by one or more processors disposed in an electronic device, implements a printer installation package, comprising:
- a printer interface driver file for implementing a printer interface for an application executing on a terminal server, the printer interface arranged for a) redirecting a printer call made by the application to a process operating on a client, the process exposing a printer preference user interface, and b) returning a result to the application; and
- a printer graphics driver file for rendering a print job on a printer, the print job being responsively configured to input into the printer preference user interface.

16. The non-transitory computer-readable medium of claim 15 in which the process is called during a terminal services session using a remote desktop protocol.

17. The non-transitory computer-readable medium of claim 15 in which the result is returned using a data structure.

18. The non-transitory computer-readable medium of claim 17 in which the data structure comprises a DEVMODE data structure.

19. The non-transitory computer-readable medium of claim 15 further including a file for implementing a client UI protocol handler module.

20. The non-transitory computer-readable medium of claim 15 in which the client UI protocol handler module is arranged for enumerating print queues on the client.

* * * * *